United States Patent

[11] 3,577,135

[72] Inventor Donald B. Steen
      Baltimore, Md.
[21] Appl. No. 716,154
[22] Filed Mar. 26, 1968
[45] Patented May 4, 1971
[73] Assignee The United States of America as
      represented by the Secretary of the Navy

[54] UNATTENDED FLASHING NAVIGATION BEACON SYSTEM
11 Claims, 1 Drawing Fig.

[52] U.S. Cl. .................................................. 340/251,
                                                                315/93
[51] Int. Cl. ............................................... H05b 41/46
[50] Field of Search .......................................... 340/251,
      331, 248 (P), 258 (D), 25; 315/87, 88—90, 92,
                                              93; 240/37.1

[56] References Cited
UNITED STATES PATENTS
1,700,226  1/1929  House .......................... 340/251UX
2,797,342  6/1957  Jacobs .......................... 340/331

Primary Examiner—John W. Caldwell
Assistant Examiner—Daniel Myer
Attorneys—L. A. Miller, Q. E. Hodges, A. Sopp and R. F. Rotella ABSTRACT: An unattended flashing navigation beacon system comprising a solid-state thermoelectric generator to supply power to the system, a Zener voltage limiter to regulate the system voltage, a capacitor bank to store power supply energy during eclipse time, a solid-state flasher, a motorized lamp changer, a first time delay circuit means for controlling the amount of time said flasher is actuated and a second time delay circuit means for controlling the amount of time said flasher is eclipsed. The flasher and lamp changer are interconnected such that a relay is activated when a lamp burns out. The relay initiates operation of the lamp changer motor and simultaneously prevents the flasher from switching to the eclipse state until a new lamp bulb is placed into position at which time the relay turns off the motor and allows the flasher to resume operation.

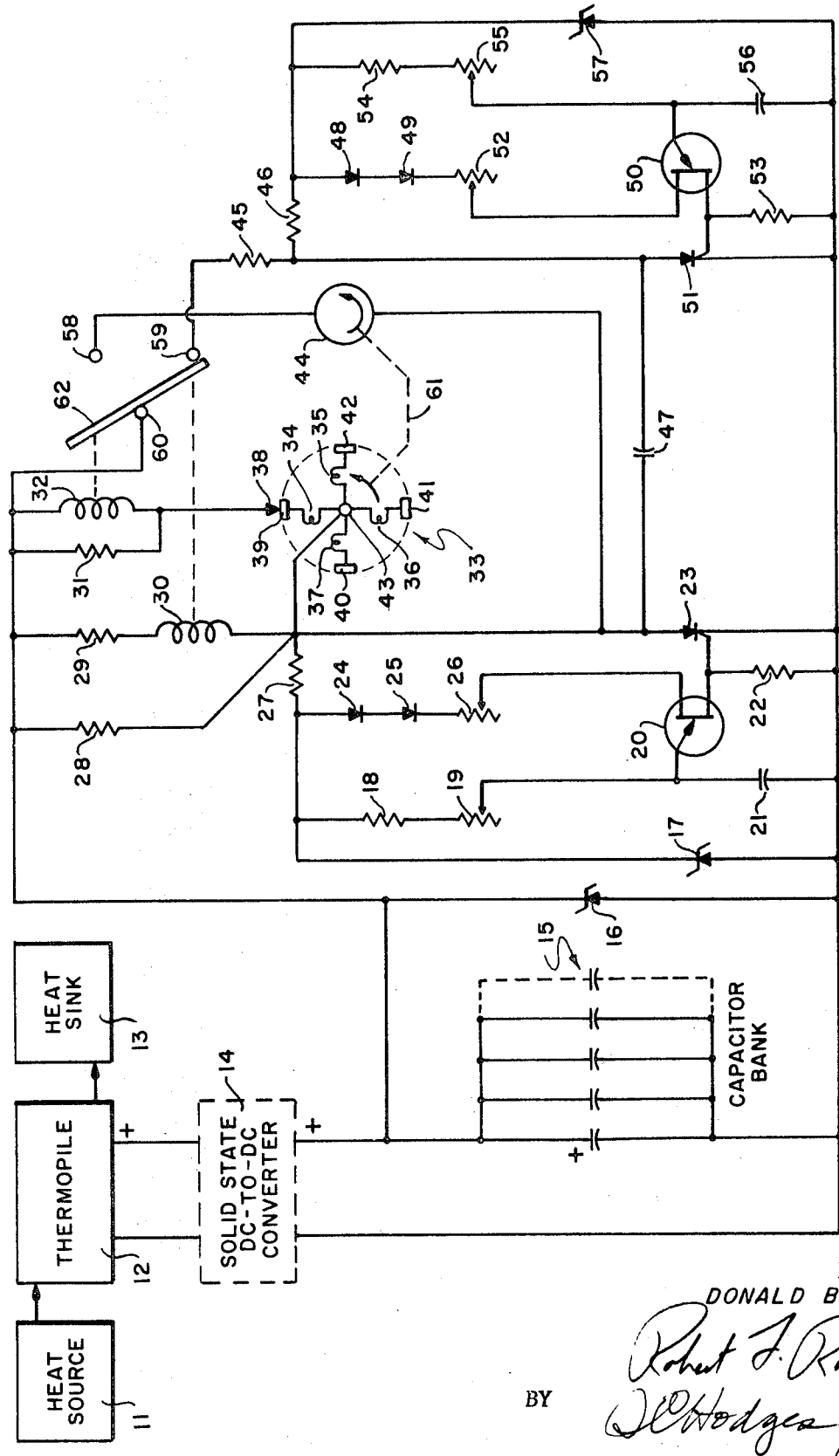

UNATTENDED FLASHING NAVIGATION BEACON SYSTEM

The invention described herein may be manufactured and used by or for the Government of the United States for governmental purposes without the payment of any royalties thereon or therefor.

BACKGROUND OF THE INVENTION

This invention relates to signalling systems and more particularly to a flashing navigation beacon system of the unattended type.

Conventional navigation beacon systems use banks of rechargeable batteries to store sufficient energy for approximately 6 months operating time, mechanical recycling timers to flash a tungsten filament lamp at a predetermined duty cycle and a mechanically operated bulb changer to replace lamps as they fail. Such systems are generally serviced at 6-month intervals, mainly because the size and weight of the battery bank becomes prohibitive for periods longer than 6 months. In addition, certain of the mechanical components cannot be relied upon for more than 6 months of unattended operation.

At 6-month intervals, the discharged battery banks are replaced by fully charged banks since it requires less time to replace the banks than to recharge them. Burned-out lamps are replaced and the timer contacts are inspected and repaired.

Obviously, maintenance of such systems involves great expenditure of time and funds. It is usually necessary to send a ship to the buoy on which the beacon system is installed. Oftentimes this is not possible due to adverse weather resulting in a potential navigation hazard if the beacon should fail.

Further disadvantages include the high cost of maintaining the battery banks which must be recharged at 6-month intervals and replaced at 3-year intervals. As the scheduled recharging time approaches, the battery is in a low state of charge and the specific gravity of the electrolyte is low making it susceptible to freezing. Another disadvantage is the fluctuation in terminal voltage as the battery discharges. This necessitates charging the battery significantly above its rated output voltage and allowing it to discharge to its normal voltage and allowing it to discharge to its normal voltage over the 6-month period. Under such conditions, premature failure of the bulbs is common requiring frequent changing.

The heretofore used mechanical timers employ flyball governor speed regulated DC motors connected through speed-reducing gears to a cam which causes a pair of switch contacts to periodically turn the bulb on and off. Special materials are employed in the motor bearings to minimize wear and close machining tolerances are required to maintain timing accuracy. The problems are compounded by arcing at the switch contacts and the need to provide continual lubrication of the motor bearings for 6-month periods.

SUMMARY OF THE INVENTION

A solid-state thermoelectric generator or thermopile powers the unattended flashing navigation beacon system and includes a Zener voltage limiter or regulator to regulate the system voltage, a capacitor bank to store power supply energy during eclipse. A solid-state flasher and motorized lamp changer are provided for normal flashing operation as well as to prevent flashing until the lamp changer switches in a new bulb in the event of bulb failure.

It is an object of this invention to provide an improved flashing navigation beacon system which overcomes the disadvantages of heretofore-used battery-powered systems by providing an improved thermoelectric power supply.

It is an object of this invention to provide an improved flashing navigation beacon system which replaces unreliable and inaccurate mechanical timers heretofore used with an improved long-lived solid-state flasher which is unaffected by environmental temperature changes.

It is an object of this invention to provide an improved flashing navigation beacon system which permits operation over long periods of time without the need for frequent routine maintenance.

It is an object of this invention to provide an improved flashing navigation beacon system which provides constant lamp output over the entire operational time and which eliminates bulb failure due to excessively high voltages.

These and other objects and advantages will become more apparent by reference to the accompanying drawing wherein the sole FIGURE is a schematic representation of the invention.

The system to be described is designed specifically for use with 32-volt, 100-watt tungsten filament lamps, operating on a duty cycle of 5 seconds. This duty cycle consists of a 1.25 second "light" followed by a 3.75 second "eclipse." Although this system was designed for a specific Coast Guard beacon application, the system can be easily adapted to any voltage, wattage, or any light and eclipse times by selection of suitable circuit components. This system comprises a solid-state voltage source to supply power for 1 year's operation, a voltage limiter to prevent circuit voltage from exceeding a set limit, a capacitor energy storage bank to store power supply output energy during the eclipse time, a solid-state flasher, and an improved motorized lamp changer. The flasher and lamp changer are interconnected in such a way so that when a bulb burns out, a relay senses an open lamp circuit. The relay starts the bulb changing motor and simultaneously prevents the flasher from switching to the eclipse state. The flasher remains in the "light" state until a new lamp bulb is properly positioned, at which time the relay senses bulb continuity. The relay then turns off the drive motor and simultaneously allows the flasher to resume operation by connecting the "eclipse" circuit. The relay is preferably of the biased differential type.

Referring to the FIGURE, the flashing navigation beacon system is powered by means of a thermoelectric generator or thermopile 12 operating between a heat source 11 and a heat sink 13. The voltage generated by thermopile 12 is fed through an optional solid-state DC-to-DC converter 14 which raises the level of the DC voltage generated by the thermopile if required by the system components.

The positive output from thermopile 12 (or converter 14, if used) is connected to one terminal of capacitor bank 15 and to the cathode of Zener diode 16. The second terminal of capacitor bank 15, anode of Zener diode 16 as well as the negative power supply lead are connected to the system ground.

Unijunction transistor 20 has its emitter connected through capacitor 21 to ground as well as through series resistors 18, 19 to the cathode of Zener diode 17. The anode of Zener diode 17 is grounded and its cathode is connected through resistor 27 to the common terminal 43 of the bulb changer mechanism 33. The first base electrode of unijunction transistor 20 is connected through resistor 22 to ground and the second base electrode is connected through the series combination of variable resistor 26 and diodes 24, 25 to the cathode of Zener diode 17. Diodes 24, 25 are poled in the same direction and are connected to the cathode of Zener diode 17 at the anode of diode 24.

The first base electrode of unijunction transistor 20 is connected to the gate electrode of silicon controlled rectifier (SCR) 23. The cathode of SCR 23 is grounded and the anode is connected to common terminal 43 of bulb changer 33, one terminal of bulb changer motor 44, and, through capacitor 47 to the anode of SCR 51. Resistor 28 and the series combination of resistor 29 and relay coil 30 are connected between the cathode of Zener diode 16 and common terminal 43 of bulb changer 33.

The bulb changer assembly 33 includes a plurality of bulbs or lamps 34, 35, 36, 37, each having one end of their respective filaments connected to common terminal 43. The other ends of the filaments are connected, respectively, to movable contacts 39, 40, 41, 42 which are arranged to make successive contact with the stationary wiper contact 38. The bulb changer assembly 33 is rotated by means of bulb changer motor 44 and mechanical linkage 61 thereby successively placing into electrical circuit each of the bulbs upon failure of the previous one. Resistor 31 and relay coil 32 are connected between wiper contact 38 and the cathode of Zener diode 6.

A magnetic latching differential relay 60 comprises a pivoting armature 62, the position of which is governed by relay coils 30 and 32. This arrangement effectively comprises a single-pole double-throw switch making contact between the power supply line (cathode of Zener diode 16) and either terminal 58 connected to the second terminal of bulb changer assembly motor 44 or terminal 59.

Unijunction transistor 50 has its first base electrode connected to the gate electrode of SCR 51 and through resistor 53 to ground. The emitter electrode of unijunction transistor 50 is connected through capacitor 56 to ground and through resistors 54, 55 to the cathode of Zener diode 57. The second base electrode of unijunction transistor 50 is connected through the series combination of variable resistor 52 and diodes 48, 49 (poled as shown) to the cathode of Zener diode 57.

Resistor 45 is connected between terminal 59 and the anode of SCR 51 (the cathode of which is grounded). Resistor 46 is connected between the anode of SCR 51 and the cathode of Zener diode 57 (the anode of which is grounded).

Referring to the FIGURE, a voltage limiter comprised of Zener diode 16 prevents the system voltage from exceeding 33.2 volts to protect the capacitor bank from high voltages and to reduce lamp bulb failure due to high voltages. When a bulb burns out, the only load on the system is the bulb-changing motor which draws only a few watts. Because of this small load, system voltage begins to rise to approach the open circuit voltage of the thermoelectric generator 12 used as the power source for the system. The open circuit voltage is approximately 66 volts. The Zener diode 16 prevents these high system voltages by switching into a conducting state whenever the voltage across it is greater than 33.2 volts. The Zener diode 16 dissipates the excess current generated by the thermoelectric generator 12, thereby preventing system voltage from increasing. When the flasher is operating normally, Zener diode 16 is ordinarily not needed since it does not dissipate any current.

The capacitor bank 15 in the preferred embodiment consists of 63 capacitors wired in parallel to give a capacitance of 1.27 farads. The capacitors are "computer grade" types which operate reliably for 15 years without appreciable drift in their parameters. The capacitor bank 15 stores the energy put out by the thermoelectric generator 12 during the "eclipse" time and releases this stored up energy during the "flash" time. The capacitor bank 15 is in a nearly fully charged state at all times. The voltage across the capacitors rises exponentially from 31 volts to 33.2 volts during the "eclipse" time and falls exponentially from 33.2 volts to 31 volts during the "light" time. This voltage swing gives an average lamp intensity of 93 watts. The capacitor bank 15 is made large enough so that the voltage rise during the "eclipse" time does not exceed 33.2 volts, thereby insuring that the voltage limiter does not operate.

Thermoelectric generator 12 converts heat directly into electrical energy by means of thermocouples. This generator requires a source of heat 11 (which may be a nuclear reactor or a commercial fuel burner) and a heat sink 13 which may be the sea water or the atmosphere. In order to provide the necessary output voltage for the beacon system, it may be necessary to step up the low voltage from the thermoelectric generator 12 to a higher level by use of an optional solid-state DC-to-DC converter 14. As far as this invention is concerned, any solid-state direct energy conversion device is acceptable if it provides the output voltage and power necessary for the beacon system, and can operate continuously for several years without any maintenance. A thermoelectric generator was selected for this application because, at the present time, it is the only direct energy conversion device having the desired characteristics.

If a sufficient number of series thermocouples is used in the thermoelectric generator, a DC-to-DC converter will be unnecessary. The converter 14 shown in the FIGURE is to be used only if it is needed.

The solid-state flasher consists of semiconductor silicon controlled rectifiers 23, 51, 17, 57; diodes 24, 25 48, 49; unijunction transistors 20, 50; resistors 18, 19, 54, 55, 26, 22, 52, 53, 27, 45, 46; and capacitors 21, 47, 56.

The flasher is capable of operating a steady state lamp load of up to 7 amperes and passing surge currents of up to 150 amperes. It will operate over a supply voltage range of 15 to 35 volts, and over a temperature range of −5° F. to +200° F. with negligible change in its parameters.

The flasher is a parallel asymmetrical inverter with capacitor commutation. Silicon controlled rectifiers 23 and 51 conduct alternately and are triggered into conduction by two unijunction transistor time delay circuits consisting of unijunction transistor 20, resistors 18, 19 and capacitor 21, and unijunction transistor 50, resistors 54, 55 and capacitor 56, respectively. Silicon controlled rectifiers are used in this flasher because, unlike other semiconductors, they need no derating in order to handle the high lamp surge currents which occur when the lamp is first turned on. The flasher provides a lamp characteristic of 1.25 seconds "light," and 3.75 seconds "eclipse."

The inverter and load circuit consists of the 100-watt lamp circuit 33, current-limiting resistor 45, silicon controlled rectifiers (SCR) 23 and 51, and commutating capacitor 47. The SCR's conduct alternately, causing load current to alternate between the lamp circuit 33 and resistor 45. Commutating capacitor 47 causes one SCR to turn off at the instant the other one turns on thereby insuring that both SCR's cannot conduct at the same time.

To explain the operation of this circuit, assume that SCR 51 is on and SCR 23 is off. A current of 60 milliamperes is flowing through resistor 45 and SCR 51. SCR 51 acts as a short circuit between the negative power supply output and the junction of resistor 46 and capacitor 47. The timing circuit comprising unijunction transistor 50 is deenergized. A current of approximately 40 milliamperes flows through 100-watt lamp 34 applying a potential of 32 volts to the junction of resistor 27 and capacitor 47. This potential charges capacitor 47, and provides power (through diodes 24, 25 and variable resistor 26) to operate the time delay circuit including unijunction transistor 20.

After a time delay of 3.75 seconds, the unijunction transistor 20 time delay circuit turns on SCR 23. SCR 23 acts as a short circuit between ground and the junction of resistor 27 and capacitor 47, thereby deenergizing unijunction transistor 20 time delay circuit. This short circuit also discharges capacitor 47 through SCR 23, applying a negative voltage spike across SCR 51 to turn it off. When SCR 51 turns off, the voltage at the junction of resistor 46 and capacitor 47 reaches 32 volts, thereby energizing the time delay circuit comprising unijunction transistor 50 causing it to operate. Current flows through resistor 45 to charge capacitor 47, and to supply power for the unijunction transistor 50 timing circuit, through diodes 48, 49 and variable resistor 52.

After a time delay of 1.25 seconds, the unijunction transistor 50 time delay circuit turns on SCR 51, and capacitor 47 discharges through SCR 51 to turn off SCR 23. The time delay circuit comprising unijunction transistor 50 becomes deenergized because of the short circuit provided by SCR 51. Due to SCR 23 turning off, the unijunction transistor 20 time delay circuit becomes operative. At this point, the cycle repeats itself.

The "eclipse" time delay circuit gates SCR 23, and consists of unijunction transistor 20, Zener diode 17, diodes 24 and 25, timing capacitor 21, timing resistors 18 and 19, current-limiting resistor 27, and gating resistor 22. The "light" time delay circuit controls SCR 51 and consists of unijunction transistor 50, Zener diode 54, diodes 48 and 49, timing capacitor 56, timing resistors 54 and 55, current-limiting resistor 46, and gating resistor 53.

The time delay circuit which operates SCR 23 will be described, since a description of the other time delay circuit is identical. Timing is initiated when SCR 23 turns off, and 32 volts appear at the junction of capacitor 47 and resistor 27. Timing capacitor 21 is charged through resistors 18 and 19 until the voltage across capacitor 21 reaches the peak point voltage of unijunction transistor 20. When the peak point voltage is reached, the unijunction transistor switches to a conducting state thereby discharging capacitor 21. Discharge current flows through resistor 22 thereby generating a positive pulse across the resistor. This positive pulse turns on SCR 23. Immediately the voltage across the time delay circuit is reduced to 1.2 volts (the voltage drop across SCR 23), thereby deenergizing the time delay circuit and making it inactive. The voltage drop of 1.2 volts provides an important circuit function in that it supplies a low bias voltage to capacitor 21. This low bias prevents forming effects in the electrolytic capacitor 21 which would cause the effective capacitance, and hence the time delay, to change as a function of the voltage history of the capacitor. This circuit, unlike other solid-state timing circuits, maintains timing accuracy for long periods of time because of this bias voltage.

The time delay depends upon the time constant [(resistor 18+19) × capacitor 21] can be set by the adjustment on resistor 19. Resistor 26 serves as a temperature compensator for the circuit. The overall time-temperature coefficient for the circuit can be set to zero at any given temperature by careful adjustment of resistor 26. Because of the nonlinear effects involved, perfect temperature compensation is not possible over the range of −50° F. to +200° F. by the use of a single resistor 26, but by using resistor 26, a variation of 2 percent over this temperature range is obtained. For beacon light application, a variation of 2 percent is considered to be negligible.

Timing capacitor 21 is preferably a tantalum capacitor, used because it is more stable and has lower leakage than normal electrolytic capacitors. Diodes 24 and 25 are preferably silicon diodes which act as voltage compensators, thereby making the peak point voltage of unijunction transistor 20 essentially independent of supply voltage.

The 100-watt lamp circuit comprises resistors 28, 29, 31, magnetic latching differential relay 60, bulb changer drive motor 44, and lamp bulbs 34—37. For convenience of illustration, only four lamp bulbs are shown, but it should be realized that the lamp changer will contain a sufficient number of bulbs to last for 1 year.

The magnetic latching differential relay 60 is a single-pole double-throw relay having two stable states (armature 62 touches either contact 58 or contact 59). Magnets are arranged within the relay so that once the armature 60 touches contact 59 it is held in that position until the current flowing through coil 30 is sufficiently large to overcome the pull of the magnet at contact 59 and the current flowing through coil 32. The armature then transfers the armature 60 to contact 58 where it is held in position by one of the magnets. To transfer the armature to contact 59, the current through coil 32 must be large enough to counteract the pull of the magnet at contact 58, and the current through coil 30. A current difference of 1.4 milliamperes is sufficient to cause the armature 60 to change position from one contact to the other. When coils 30 and 32 become deenergized, the armature 62 remains in the position that it occupied before current was removed.

The bulb-changing mechanism 33 is a rotating assembly having a number of lamp sockets. A sufficient number of lamps are placed into the sockets to provide enough lamps for 1 year of unattended operation. The bulb changer mechanism is rotated by a DC motor device 44, and a movable contact 39- —42 is attached to each lamp socket to insure that current cannot flow through a lamp until the lamp is located in a particular position with respect to the Fresnel zone lens (not shown). Motor 44 rotates the bulb changer at approximately 1 r.p.m.

When the flasher is operating normally, the armature 62 is touching contact 59. The flasher is functioning as described above. During "eclipse," current flows through armature 62 to contact 59 and then through resistor 45 and SCR 51. Current to operate the "eclipse" time delay circuit flows through coil 32, resistor 31, and through the parallel circuit of resistors 28, 29 and coil 30. Most of the current flows through coil 32 and resistor 31, since it contains the least resistance.

After a time delay of 3.75 seconds, the flasher switches to the "light" mode. A current of 2 milliamperes now flows through coil 30, and a current starting at 28 milliamperes and ending at 2 milliamperes flows through coil 32 (starting current for the lamp is 14 times its steady state current). The current through coil is more than sufficient to insure that the armature 60 is held on contact 59. Current to operate the "light" time delay circuit is obtained through armature 62, contact 59, and resistor 45.

After a time delay of 1.25 seconds, the flasher switches back to the "eclipse" mode. During the flasher's entire cycle, it should be noted that the armature 60 has never left contact 59, having been either held in place by the magnet at contact 59 during the "eclipse" mode, or by the difference in current through coils 32 and 30 (26 milliamperes to 0 milliamperes difference). The motor means 44 has not become energized, and the bulb changer 33 has not rotated.

Resistors 31 and 29 are selected so that the proper operating currents are flowing through coils 32 and 30, respectively. Resistor 28 provides sufficient holding current for SCR 23 to insure that it will stay on during the bulb changing operation (10 milliamperes is required to keep SCR 23 from turning off).

Assume that the flasher is in the "eclipse" mode. After a time delay of 3.75 seconds, the flasher switches to the light mode. At this point, it should be noted that, even if the bulb burns out during the "eclipse" mode, sufficient current can flow through resistor 28 and resistor 29/coil 30 to energize the "eclipse" time delay circuit and cause it to energize the "eclipse" time delay circuit and cause it to operate; the time delay will be approximately 6 seconds, however. After switching to the "light" mode, assume that the lamp burns out. Because of the burned out lamp, no current flows through coil 32. The 2 milliamperes that is flowing through coil 30 is not opposed by current through coil 32, and the armature 60 leaves contact 59 and touches contact 58. When contact 59 is broken, current ceases flowing through resistor 45, and the "light" time delay is broken, current ceases flowing through resistor 45, and the "light" time delay circuit becomes deenergized. Because the flasher cannot switch to the "eclipse" mode, it remains in the "light" mode with SCR 23 conducting. The motor means 44 becomes energized through armature 60, contact 58, and SCR 23, and begins to turn the bulb changer 33 until lamp 35 reaches the position formerly occupied by lamp 34. At this point, the movable contact 42 connected to lamp 35 touches the stationary wiper contact 38 thereby completing the circuit through coil 32, lamp 35 and SCR 23. When this circuit is completed, 28 milliamperes flows through coil 32 overbalancing the 2 milliamperes flowing through coil 30, and causing the armature 60 to leave contact 58 and touch contact 59. With the armature 60 now touching contact 59, the flasher resumes normal operation as before. It remains in normal operation until lamp 35 burns out and is replaced by lamp 36. Enough bulbs are included in the bulb changer for 1 year's unattended operation of the beacon system. Usually, only 4 heavy-duty bulbs are required, but more may be added if necessary.

Although, in many instances, particular values have been given for circuit parameters, it is to be understood that such values are merely exemplary and that the circuit designs may be suitably modified for particular requirements within the scope of the invention.

Having described the invention, it will be apparent that many modifications will be obvious to one skilled in the art and, consequently, the scope of the invention is to be measured solely by the following claims.

I claim:
1. A flashing navigation beacon system comprising:

power supply means having a voltage output;
energy storage means coupled to said power supply output;
voltage regulator means coupled to said energy storage means and having an output;
illumination means coupled to said voltage regulator means;
first time delay circuit means for controlling the amount of time said illuminating means is actuated;
second time delay circuit means for controlling the amount of time said illuminating means is eclipsed;
said first and second time delay circuit means being connected to said illuminating means;
charger means for replacing illumination means which have failed; and
sensing means responsive to current flowing in said illumination means for actuating said changer means;
said first time delay circuit means comprises a first unijunction transistor having first and second base electrodes and an emitter electrode, said emitter electrode being coupled through a first resistance-capacitance network to said power supply means.

2. A flashing navigation beacon system as set forth in claim 1 wherein said power supply means comprises thermoelectric generator means operating between a heat source and heat sink.

3. A flashing navigation beacon system as set forth in claim 2 wherein said energy storage means comprises first capacitor means.

4. A flashing navigation beacon system as set forth in claim 3 wherein:
said voltage regulator means comprises first Zener diode means connected across said capacitor means; and
said power supply means voltage output having first and second polarity terminals:

5. A flashing navigation beacon system as set forth in claim 4 wherein:
said illumination means comprises a plurality of electric lamps each having a filament winding;
one end of the filament winding of each of said lamps being connected in common;
the other end of the filament winding of each of said lamps capable of being coupled to said power supply means; and
only one of said lamps being coupled to said power supply means at a given time.

6. A flashing navigation beacon system as set forth in claim 1 wherein:
said second time delay circuit means comprises a second unijunction transistor having first and second base electrodes and an emitter electrode;
said emitter electrode being coupled through a second resistance-capacitance network to said power supply means.

7. A flashing navigation beacon system as set forth in claim 6 further comprising:
a first and second silicon controlled rectifier (SCR) each having an anode, cathode, and gate electrode;
the gate of said first SCR being connected to the first base electrode of said first unijunction transistor;
the gate of said second SCR being connected to the first base electrode of said second unijunction transistor;
second capacitor means connected between the anodes of said first and second SCR's;
the anode of said second SCR being coupled to said first polarity terminal of said power supply means.

8. A flashing navigation beacon system as set forth in claim 7 further comprising:
switch means connected to said first polarity terminal for selectively applying power to either a first or second switch terminal;
said first switch terminal being connected to the anode of said first SCR;
electric motor means mechanically coupled to said illumination means for effecting the coupling of said illuminating means to said power supply means;
one terminal of said electric motor means being connected to said second switch terminal; and
the other terminal of said electric motor means being connected to the anode of said second SCR.

9. A flashing navigation beacon system as set forth in claim 8 further comprising:
first relay coil means for controlling the position of said switch means connected between said first polarity terminal and the anode of said second SCR;
second relay coil means for controlling the position of said switch means connected between said first polarity terminal and said illuminating means which is being coupled to said power supply means.

10. A flashing navigation beacon system as set forth in claim 9 wherein:
the second base electrode of said first unijunction transistor is connected through a diode-resistor network to the anode of said first SCR;
the second base electrode of said second unijunction transistor is connected through a diode-resistor network to the anode of said second SCR; and
second and third Zener diodes connected across said first and second resistance-capacitance networks, respectively.

11. A flashing navigation beacon system as set forth in claim 10 wherein:
said power supply means comprises thermoelectric generator means operating between a heat source and heat sink;
said energy storage means comprises first capacitor means;
said voltage regulator means comprises first Zener diode means connected across said capacitor means;
said power supply means voltage output having first and second polarity terminals; and
said illumination means comprises a plurality of electric lamps each having a filament winding one end of the filament winding of each of said lamps being connected in common the other end of the filament winding of each of said lamps capable of being coupled to said power supply means and only one of said lamps being coupled to said power supply means at a given time.